United States Patent [19]

Anahara et al.

[11] Patent Number: 4,750,247
[45] Date of Patent: Jun. 14, 1988

[54] APPARATUS FOR MANUFACTURING A FIBER REINFORCEMENT BODY

[75] Inventors: Meiji Anahara; Yoshikatsu Mizuno, both of Kariya; Mitsutoshi Hirano, Aichi; Fukuo Gomi, Nagoya, all of Japan

[73] Assignee: Kabushiki Kaisha Toyoda Jidoshokki Seisakusho, Kariya, Japan

[21] Appl. No.: 18,621

[22] Filed: Feb. 25, 1987

Related U.S. Application Data

[62] Division of Ser. No. 729,297, May 1, 1985, Pat. No. 4,671,336.

[30] Foreign Application Priority Data

May 3, 1984 [JP] Japan ................................ 59-89973

[51] Int. Cl.$^4$ .......................... B23P 21/00; B21F 3/00
[52] U.S. Cl. .................................. 29/33 E; 29/33 F; 140/92.2; 242/7.09
[58] Field of Search ................... 29/33 C, 33 E, 33 F, 29/33 K, 240, 156.8 B; 242/7.02, 7.21, 7.09, 7.04, 4 A; 140/92.2; 264/257; 156/428

[56] References Cited

U.S. PATENT DOCUMENTS

| | | | |
|---|---|---|---|
| 2,246,608 | 6/1941 | Taylor et al. | 140/92.2 |
| 2,929,755 | 3/1960 | Porter | 29/156.8 B |
| 2,973,787 | 3/1961 | Thwaites et al. | 242/7.09 X |
| 3,090,569 | 5/1963 | Beushauser | 242/7.09 |
| 3,804,131 | 4/1974 | Holmes et al. | 140/92.2 |

FOREIGN PATENT DOCUMENTS

| | | | |
|---|---|---|---|
| 503525 | 2/1929 | Fed. Rep. of Germany | 242/4 A |
| 57-32917 | 2/1982 | Japan | 264/257 |

Primary Examiner—William R. Briggs
Attorney, Agent, or Firm—Brooks Haidt Haffner & Delahunty

[57] ABSTRACT

An apparatus for manufacturing a fiber reinforcement body which is to be incorporated into a metal matrix in a fabrication technique based on a molten metal infiltration process for producing a metal matrix composite material are disclosed herein. The apparatus of the invention comprises means for supporting the chill members in longitudinally spaced relation to each other, means for forming uniformly distributed windings of the yarn on each of the chills, and means for forming similar windings of the yarn around, and extending between the chills in a way so as to connect them together.

6 Claims, 4 Drawing Sheets

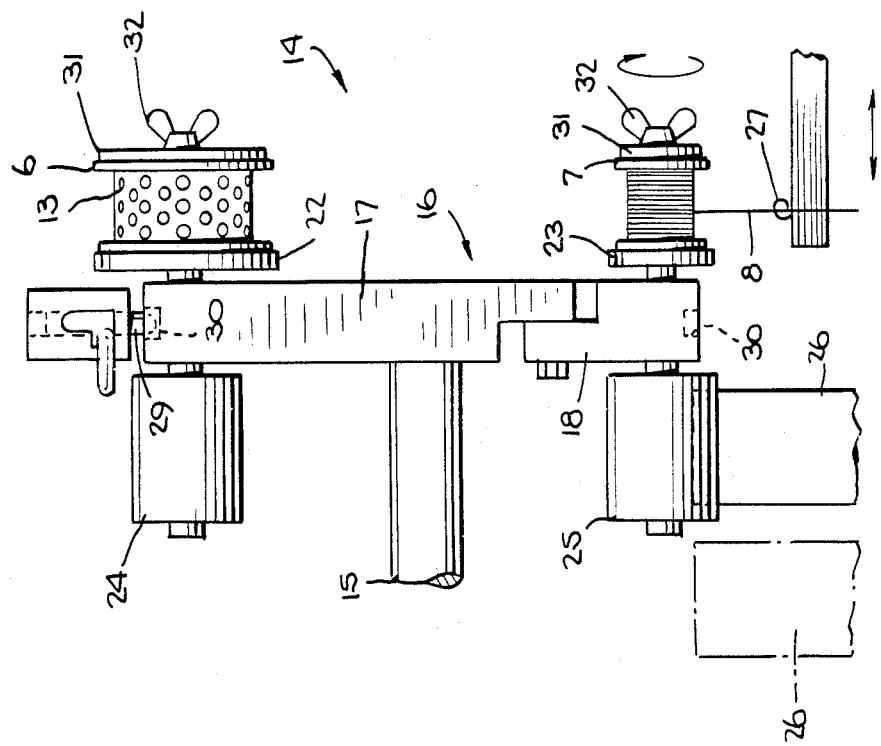
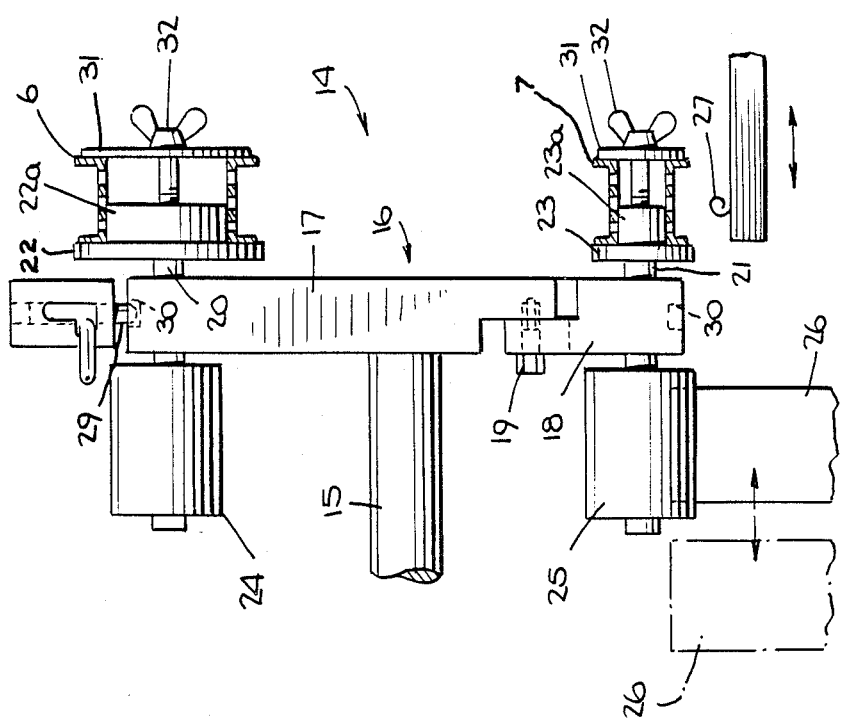

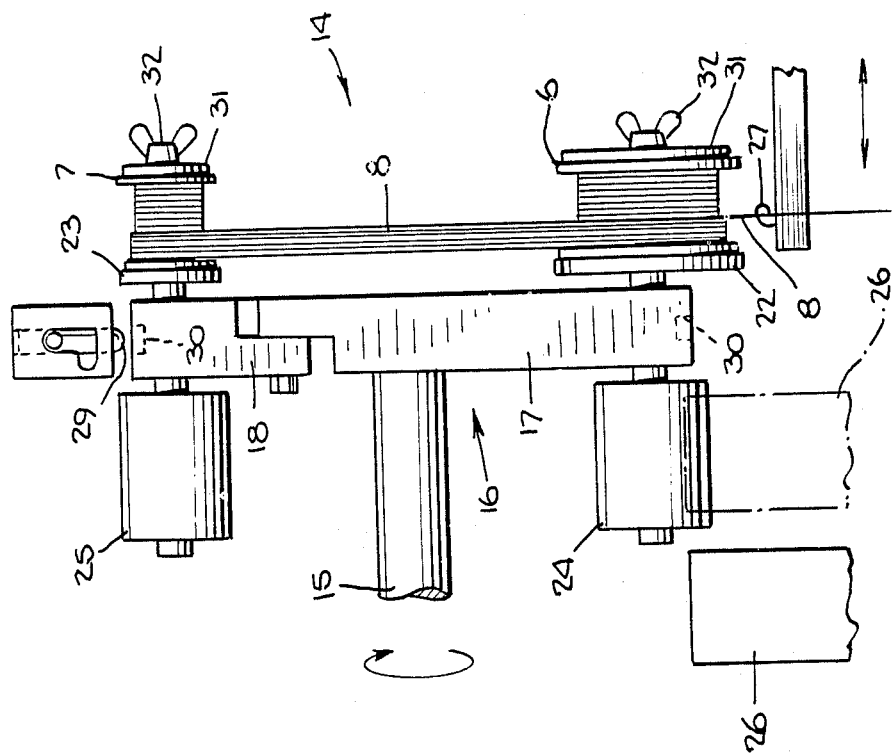
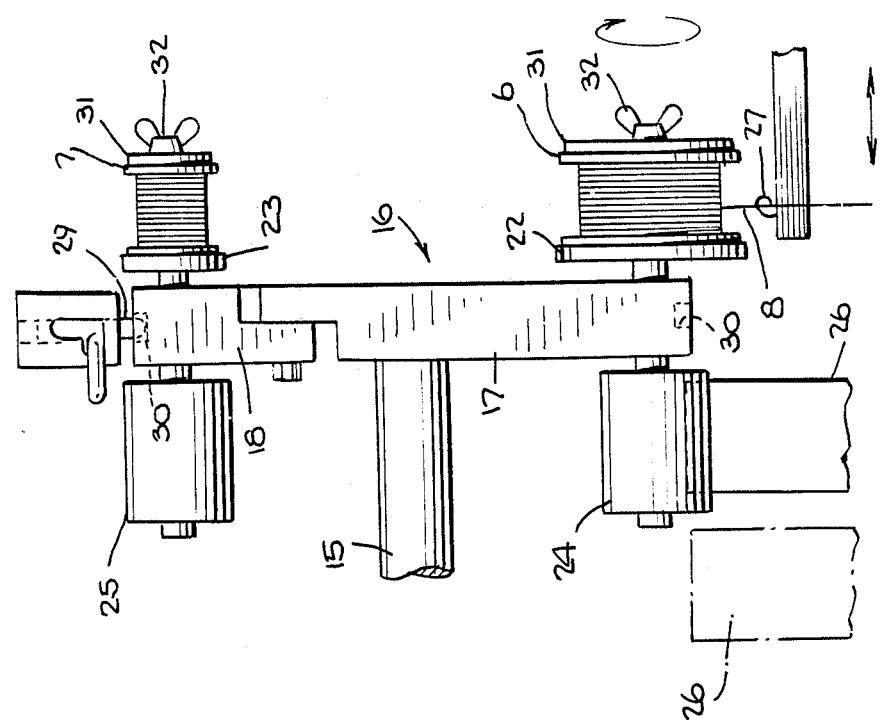

4,750,247

APPARATUS FOR MANUFACTURING A FIBER REINFORCEMENT BODY

This is a division of application Ser. No. 729,297, filed May 1, 1985, now U.S. Pat. No. 4,671,336.

FIELD OF THE INVENTION

The present invention relates to a method of manufacturing a fiber reinforcement body which is placed in a mold cavity to be incorporated as a part of the metal matrix in a fabrication technique based on molten metal infiltration, such as squeeze casting, an autoclave process, etc., thereby reinforcing the resulting metal matrix composite (MMC) part. The invention also relates to an apparatus for performing the method. More specifically, it relates to a method and an apparatus for forming the fiber reinforcement body wherein a yarn of reinforcing fibers is first wound on each of a plurality of spaced apart inserts or internal chills, each in the form of a reel and made of any easily-machinable metal, and then around and between the chill members so as to connect them together.

BACKGROUND OF THE INVENTION

A fabrication technique based on molten metal infiltration casting for producing metal matrix composites (MMC) and a technique for reinforcing such composites by use of fibers made of reinforcing materials, such as aluminium oxide, silicon carbide, silicon nitride, boron, graphite, etc., which are incorporated into the metal matrix are known in the relevant art. In the production of metal matrix composites thus reinforced by fibers, parts of various alloys containing from 30 to 60 percent fibers by volume can be fabricated relatively easily. It is known from the well-established rule of mixture that a high content of such fibers can improve the mechanical and physical properties of the fiber-reinforced metal matrix composites.

For successfully reinforcing the metal matrix composite with fibers, it is very important that the reinforcement should have the right content of fibers and be set rigidly at the right location in the cavity of the casting mold. One example for achieving the desired rigidity of the fiber reinforcement is disclosed by Japanese Patent Publication No. 56-111,565 of 1981, according to which reinforcing fiber bundles are immersed in a volatile organic solvent and thereafter shaped into a fiber reinforcement body having a form which suits the mold cavity in which it is to be placed. In a further known proposal disclosed by Japanese Patent Publication No. 56-66,368 of 1981, a yarn of high-strength fibers is wound around an aluminium wire to make a reinforcement string, and a number of such strings are shaped into a reinforcement body having a form which substantially corresponds to that of the casting to be produced.

However, these proposals have a serious disadvantage in that, because the fibers of the reinforcement body when placed in the mold cavity tend to be moved easily, they are very likely to be deflected from their intended location within the cavity by the flow of molten metal as it is being injected into the cavity under pressure, with the result that the strength of the resulting metal matrix composite is decreased, or part of the fibers may be exposed on the product surface. In addition, because fiber reinforcement bodies according to the prior art are made by hand, the fibers cannot be practically arranged with the required uniformity of distribution thereof within the body, and manufacturing of reinforcement bodies on a mass production basis cannot be achieved.

SUMMARY OF THE INVENTION

It is an object of the present invention, therefore, to solve the above problems by providing a method wherein fiber bundles can be wound and prepared in a continuous and orderly arrangement, desirably with the aid of a winder.

It is another object of the invention to provide an apparatus for performing the method.

The above object is achieved by a method which comprises the steps of preparing at least two internal chill members each made of any easily-machinable metal and each preferably in the form of a spool or reel, forming uniformly distributed windings of a yarn of reinforcement fibers on the periphery of each such ring-shaped chill member, and then forming similar windings of the yarn in the form of a belt extending around and between the spaced apart chill members so as to interconnect them. If required, the interconnecting portion of the fibers extending between the chill members can be reshaped into any desired form by using means as will be described for reshaping and retaining the fibers.

Additionally, the present invention discloses an apparatus for carrying out the above method, which comprises means for supporting each of the chill members in spaced-apart relation, means for forming windings of the yarn of reinforcement fibers on the periphery of each chill member, and means for forming windings of the yarn around and extending between the chill members so as to connect them together.

BRIEF DESCRIPTION OF THE DRAWINGS

FIG. 3 is a plan view, partly in section, of an embodiment of apparatus constructed according to the invention;

FIG. 4 is a plan view of the apparatus of FIG. 3, showing the step of the method during which windings of reinforcement fibers are being formed on the periphery of one internal chill mounted on the apparatus;

FIG. 5 is a plan view similar to FIG. 4, but showing the step in which the periphery of another chill is being wrapped with fiber windings;

FIG. 6 is a plan view of the apparatus, showing the step during the forming of windings of fibers in the form of a belt around, and extending between the two internal chills.

DETAILED DESCRIPTION OF THE PREFERRED EMBODIMENT

Figure 1:
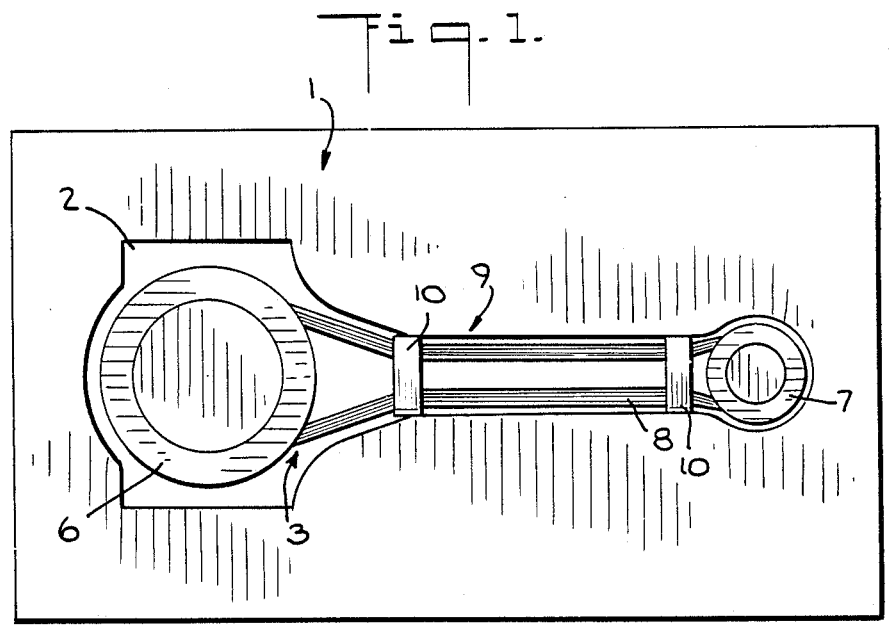
FIG. 1 is a plan view showing a fiber reinforcement body made according to the present invention and placed in the cavity of a metal mold for casting a connecting rod of an internal combustion engine by a fabrication technique based on a molten metal infiltration process.
Figure 2:
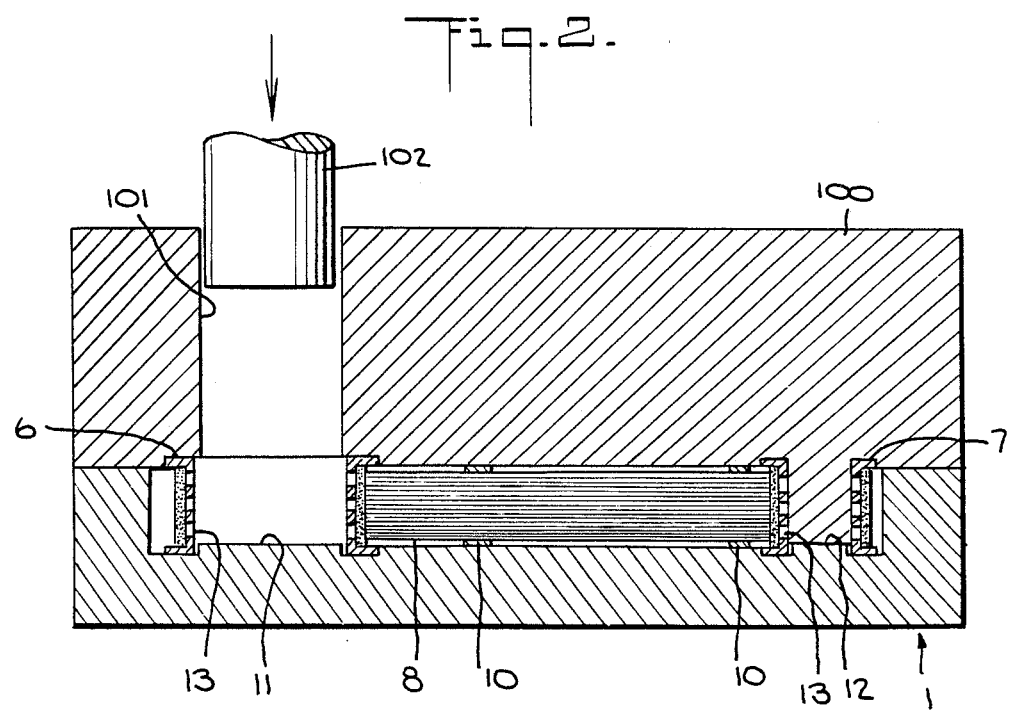
FIG. 2 is a side sectional view of FIG. 1.

Referring now to the drawings wherein a preferred embodiment of the present invention is illustrated, reference numeral 1 in FIGS. 1 and 2 designates a metal mold or die cooperating with its associated upper mold or cope 100 to form a cavity 2 therein which is so shaped in the illustrated embodiment as to cast a connecting rod of an internal combustion engine by using a fluid metal infiltration process. A fiber reinforcement body 3 is accommodated and set within the mold cavity 2. The body 3 includes a pair of insert chills 6 and 7 made of an easily-machinable metal, such as an aluminium or a stainless steel, the purpose of which is well known in the art, each preferably in the form of a ring or reel. The chills 6 and 7 are disposed at respective locations within the cavity 2 corresponding to the journals at the large and small ends of the connecting rod, respectively. Each chill member has wrapped on its periphery a uniformly distributed series of windings of a yarn 8 across its width, forming a bundle of fibers of any reinforcing material, such as aluminium oxide, silicon carbide, silicon nitride, boron, graphite, or other yarn fiber material, and the two chill members 6, 7 are connected by additional and similarly distributed windings of the yarn 8 forming an endless belt running therearound and extending therebetween. As most clearly seen in FIG. 1, two metal members 10, 10 each bent into a rectangular shape are attached to the intermediate belt portion to reshape the belt portion into a form commensurate with the portion of the cavity 2 corresponding to the rod portion 9 of the connecting rod, and to maintain that form. As shown in FIG. 2, the mold cavity 2 has upward projections 11 and 12 formed at respective locations to receive into the central openings or bores of the chill members 6 and 7, respectively, so that the reinforcement body 3 when set into the mold cavity 2 may be held in the cavity 2 securely, with its yarn windings extending along the rod portion 9, and under proper tension.

The chill members 6, 7 are formed at the cylindrical portions thereof with a plurality of perforations 13, as shown in FIG. 2 and also in FIG. 4, to permit thorough infiltration of molten metal in the mold cavity 2 when the fluid metal, which is poured through a sprue hole 101 formed in the cope 100, is squeezed to be infiltrated throughout the cavity 2, under pressure exerted by a plunger 102.

Reference is now made to FIGS. 3 to 7 which illustrate an apparatus of the invention for making the above-described fiber reinforcement body 3, and the method according to the invention by which the body is made using the apparatus.

The apparatus comprises a winding device which is designated generally by reference numeral 14. The winder 14 includes an extensible arm assembly 16 fixed at its center on the end of a rotatable main shaft 15, the arm assembly 16 being shown in its lengthened or extended state in FIG. 3, as will be explained. The arm assembly 16 further includes a main arm portion 17 which is fixed to the shaft 15, and a movable arm portion 18 which is slidably fastened to an end of the arm portion 17 by means of a bolt 19 passed through an elongated hole in such a way that the arm portion 18, when unfastened, may be moved toward and away from the the main arm portion 17. At the respective ends of the arm assembly 16, i.e., on the free end of the arm portion 17 and on the arm portion 18, are supported rotatably shafts 20, 21 in longitudinally spaced-apart relation. The shafts 20, 21 have respective guide rollers 22, 23, including respective projecting portions 22a, 23a, carried on the ends thereof, on the right-hand side as viewed in the drawing, for receiving thereon the chill members 6, 7, respectively. In addition, the shafts 22, 23 carry respective rubber rollers 24, 25 on their opposite ends, for receiving power by which the shafts 20, 21 are respectively rotated.

The rubber rollers 24, 25, and hence the guide rollers 22, 23 carried on the common shafts 20, 21, are driven one at a time by a shiftable friction wheel 26 which, when shifted to its operative position as shown by full lines in FIGS. 3 to 5, is brought into frictional driving contact with either of the rubber rollers 24, 25 which, at the time, is positioned adjacent thereto, as will be seen. The friction wheel 26 may be shifted to its inoperative position, as shown by phantom lines in FIGS. 3 to 5, in which it is out of contact with the adjacent rubber roller. Reference numeral 27 designates a yarn guide which operates in conjunction with the rotation of the friction wheel 26 when in its operative position, and in conjunction with the rotation of the main shaft 15, to reciprocate laterally over a distance corresponding to the winding width on the periphery of the chill members 6, 7, for guiding and depositing the yarn 8 on the chill members as the yarn is paid off from its source (not shown). Thus, the yarn is wound evenly on and across the peripheries of the chill members 6, 7 to form orderly built-up windings.

The chill members 6, 7 are detachably mounted on their corresponding guide rollers 22, 23 by means of wing head bolts 32 and washers 31 which press them against the laterally facing surfaces of the rollers, as shown. The central openings or bores of the chill members are respectively received on the projections 22a, 23a. Thus, the chills 6, 7 are held in longitudinally spaced-apart relation with respect to each other.

A retractable stop pin 29 is provided which cooperates with its associated holes 30, 30 formed at the outermost ends of the arm assembly 16, respectively, for holding the arm 16 stationary during winding of the yarn 8 on either of the chill members. This pin 29 is disengaged from either of the holes 30 when the entire arm assembly 16 is rotated by the main shaft 15, as will be seen.

In operation of the apparatus thus constructed, firstly, the leading end of a strand of the yarn 8 as supplied from the source (not shown) is passed through the yarn guide 27 and is attached on the periphery of the chill member 7. Then, the friction wheel 26 is brought into contact with the rubber roller 25, and rotated to drive the shaft 21. The chill member 7 carried on the same shaft 21 is thus caused to rotate and, simultaneously, the yarn guide 27 starts moving reciprocatingly, in lateral direction, in controlled relation with the rotation of the shaft 21. Accordingly, the fiber yarn 8 is wound in an evenly built-up arrangement onto the periphery of the chill member 7, as shown in FIG. 4, because of the reciprocating motion of the yarn guide 27 in unison with the rotation of the chill member 7. The amount or volume of the fiber winding to be formed on the chill member may be ascertained by using any known device for counting the number of rotations of the shaft 21, and hence the number of turns of the yarn 8 on the member. It may be so arranged that the drive for the friction wheel 26 is stopped automatically when a predetermined volume of the winding is formed on the chill member.

After the chill member 7 has been wrapped with the predetermined quantity of fibers, the yarn 8 is cut off and the friction wheel 26 is shifted to its inoperative position as shown by phantom lines in FIG. 4. With the friction wheel 26 held in its inoperative position, the main shaft 15 is turned 180° to bring the the other chill member 6 to the winding position adjacent to the yarn guide 27 and friction wheel 26, and the friction roller 26 is again shifted to its operative position where it contacts the rubber roller 24, as shown in FIG. 5. By attaching the cut leading end of the yarn 8 passed through the yarn guide 27 to the chill member 6, and then driving the shaft 20 by the friction wheel 26, by way of the rubber roller 24 in contact therewith, an even build-up of yarn winding is formed on the periphery of the chill member 6 in manner similar to that in which the yarn was wound on the chill member 7.

After the winding of the reinforcing yarn fiber on both chill members 6, 7 has been completed, the friction wheel 26 is moved to its inoperative position, and the main shaft 15 is driven by means, not shown, so as to rotate in the direction indicated by the arrow in FIG. 6, a direction which will not cause unwinding of the yarn already formed on the chill member 6. Because the yarn guide 27 is reciprocated in timed relation to the rotation of the main shaft 15, the fiber bundle 8 is wound around and between both chill members 6 and 7 in an even manner, in the form of an endless belt that interconnects the two chill members. FIG. 6 shown an intermediate stage of such winding operation, before a complete belt of fibers has been formed.

Figure 7:
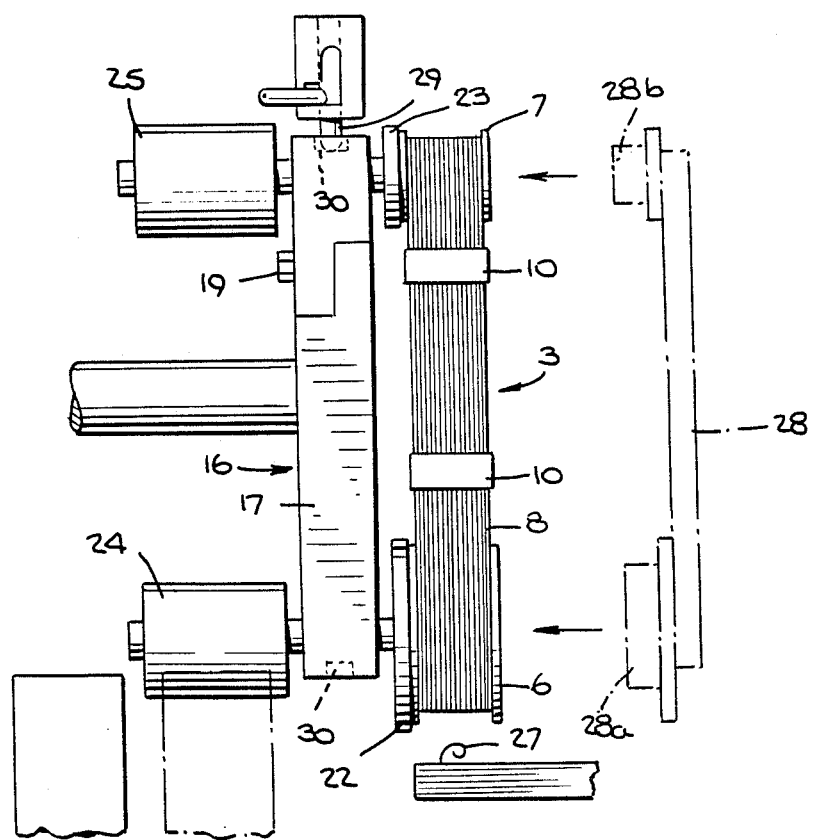
FIG. 7 is a plan view showing the step wherein, after the fiber winding operations have been completed, the fiber belt is being reshaped.

The rotation of the main shaft 15 is stopped as the winding of the yarn 8 between the chill members 6, 7 is completed, and the bolt 19 is loosened to permit movement of the arm portion 18. Then, the two metal members 10 are attached to the fiber belt at respective intermediate locations between the chill members 6, 7, as shown, while sliding them gradually toward each other. In the illustrated embodiment, the metal members 10, 10 are provided on the belt portions at such locations and in such a way that the resulting shape of the intermediate portion of the fiber reinforcement body 3 substantially corresponds to the shape of the rod portion 9 of the mold cavity 2. Furthermore, the movable arm portion 18 is so arranged that the arm assembly 16 is fully contracted, or assumes its shortest size as shown in FIG. 7, when the attachment of the metal members 10, 10 is completed.

Though the reinforcement body 3 thus formed may be separated from the guide rollers 22, 23 merely by removing the bolts 32 and their washers 31, it is desirable that the body should be removed from the winder 14 without disturbing the orderly arrangement of the fiber windings. Accordingly, a jig 28, which is designed specifically to conform to the shape of the reinforcement body as shown in FIG. 7, may be used advantageously for the purposes of maintaining the desired tension of the fibers along the intermediate portion of the body 3, as well as for avoiding the abovesaid disturbance of the fiber windings. Furthermore, this jig 28 may be used as a holder for the fiber reinforcement body 3 when setting it into the mold cavity 2. That is, as seen in FIG. 7, the jig 28 has respective cylindrically shaped portions 28a, 28b which project and fit snugly into the respective bores of the chill members 6 and 7 while the fully formed body 3 is still mounted on the winder 14, to maintain their spaced relation. The body 3 is then removed from the similar projections 22a, 23a on the winder rollers 22, 23, with the jig 28 connected thereto, and is placed within the mold cavity 2 with the bores of its chills 6, 7 received on the similarly shaped mold projections 11 and 12 (FIG. 2). The jig 28 is then removed, and the mold is closed.

As it is now apparent from the foregoing, the use of the method or apparatus of the invention, according to which any desired quantity of reinforcement fibers can be wound on chill members in an orderly arrangement, can contribute to the improvement of properties of the fiber-reinforced metal matrix composites to be produced by fluid metal infiltration casting processes, and also makes possible mass-production of the fiber reinforcement bodies with easy maintenance of their intended quality.

While the invention has been illustrated and described with reference to specific embodiments, it is to be understood that various modifications in the details of the method or the apparatus may be made without departing from the spirit and scope of the invention.

What is claimed is:

1. Apparatus for manufacturing a fiber reinforcement body for a metal matrix for use in a molten metal infiltration casting process for producing a metal matrix composite article, said apparatus comprising:
    means for supporting at least two reel members thereon in space apart relation to each other;
    first forming means including means for rotating each said reel member, and means for guiding reinforcing yarn material on the reel member during said rotation thereof in order to form windings of the reinforcing yarn material on each of said reel members; and
    second means for forming windings of said reinforcing yarn material around and between all of said reel members so as to connect them together in their spaced apart relationship;
    said second forming means including means for rotating said supporting means to rotate all of said reel members together in their said spaced relation, and means for moving and guiding said yarn material around and between peripheries of said reel members during the rotation thereof;
    said supporting means including means for varying the spacing between said reel members.

2. Apparatus according to claim 1, wherein said means for moving and guiding said yarn comprises reciprocatable yarn guide means mounted for movement parallel to the axis of said rotation of each said reel member.

3. Apparatus according to claim 1, wherein said means for moving and guiding said yarn comprises reciprocatable yarn guide means mounted for movement parallel to the axis of said rotation of all of said reel members.

4. Apparatus according to claim 1, wherein said supporting means includes an arm member having a first portion supporting one of said reel members and a second portion supporting another of said reel members, said second portion being displaceable with respect to said first portion of the arm member for varying the distance of said spacing between said reel members when mounted thereon.

5. Apparatus according to claim 1, wherein said apparatus has two of said reel members mounted thereon, each of said reel members including internal metal chills to be incorporated into said metal matrix composite article.

6. Apparatus according to claim 5, wherein said internal metal chills respectively substantially correspond in size and shape to the journal portions at the large and small ends of a connecting rod for an internal combustion engine.

* * * * *